(12) United States Patent
Krockenberger

(10) Patent No.: US 10,794,814 B2
(45) Date of Patent: Oct. 6, 2020

(54) METHODS AND SYSTEMS FOR SAMPLE ANALYSIS

(71) Applicant: Abbott Laboratories, Abbott Park, IL (US)

(72) Inventor: Martin Krockenberger, Los Gatos, CA (US)

(73) Assignee: Abbott Laboratories, Abbott park, IL (US)

( * ) Notice: Subject to any disclaimer, the term of this patent is extended or adjusted under 35 U.S.C. 154(b) by 232 days.

(21) Appl. No.: 15/987,620

(22) Filed: May 23, 2018

(65) Prior Publication Data

US 2018/0340881 A1    Nov. 29, 2018

Related U.S. Application Data

(60) Provisional application No. 62/511,237, filed on May 25, 2017.

(51) Int. Cl.
| | |
|---|---|
| *G01N 15/06* | (2006.01) |
| *G01N 35/00* | (2006.01) |
| *G01N 33/48* | (2006.01) |
| *G01N 33/00* | (2006.01) |
| *G01N 15/14* | (2006.01) |
| *G01N 15/00* | (2006.01) |
| *G01N 15/10* | (2006.01) |

(52) U.S. Cl.
CPC ..... *G01N 15/1429* (2013.01); *G01N 15/1404* (2013.01); *G01N 15/1436* (2013.01); *G01N 15/1459* (2013.01); *G01N 2015/0038* (2013.01); *G01N 2015/0073* (2013.01); *G01N 2015/0084* (2013.01); *G01N 2015/1006* (2013.01); *G01N 2015/1402* (2013.01); *G01N 2015/1481* (2013.01)

(58) Field of Classification Search
CPC ........... G01N 15/1429; G01N 15/1404; G01N 15/1436; G01N 15/1459; G01N 2015/0084; G01N 2015/1006; G01N 2015/1402; G01N 2015/1481; G01N 35/00; G01N 33/48; G01N 15/06; G01N 33/00
See application file for complete search history.

(56) References Cited

U.S. PATENT DOCUMENTS

| | | |
|---|---|---|
| 5,631,165 A | 5/1997 | Chupp et al. |
| 9,011,773 B2 | 4/2015 | Shoffner et al. |
| 9,028,778 B2 | 5/2015 | Mamaghani et al. |
| 9,091,625 B2 | 6/2015 | Wu et al. |

(Continued)

FOREIGN PATENT DOCUMENTS

| | | |
|---|---|---|
| CA | 2192835 C | 6/2000 |
| WO | 2007095359 A2 | 8/2007 |
| WO | 2014159692 A1 | 10/2014 |

*Primary Examiner* — Brian J. Sines
(74) *Attorney, Agent, or Firm* — Edward J. Baba; Bozicevic, Field & Francis LLP

(57) ABSTRACT

The present disclosure includes provides methods for analyzing biological samples to identify, classify, and/or quantify platelets in the sample. The present disclosure also provides systems and methods for analyzing a blood sample to determine presence of platelet clumps in the sample. Also provided are systems configured for performing the disclosed methods and computer readable medium storing instructions for performing steps of the disclosed methods.

14 Claims, 10 Drawing Sheets

(56) References Cited

U.S. PATENT DOCUMENTS

| | | | | |
|---|---|---|---|---|
| 2003/0030783 A1* | 2/2003 | Roche | ................... | H04L 25/063 |
| | | | | 356/39 |
| 2003/0194818 A1* | 10/2003 | Hechinger | ........... | G01N 33/582 |
| | | | | 436/513 |
| 2005/0255600 A1* | 11/2005 | Padmanabhan | .... | G01N 15/1484 |
| | | | | 436/63 |
| 2007/0059777 A1* | 3/2007 | Tablin | .................... | G01N 33/86 |
| | | | | 435/7.2 |
| 2008/0286807 A1* | 11/2008 | Bakke | .................. | G01N 33/542 |
| | | | | 435/7.2 |

* cited by examiner

METHODS AND SYSTEMS FOR SAMPLE ANALYSIS

CROSS-REFERENCE TO RELATED APPLICATIONS

This application claims the benefit of U.S. Provisional Patent Application No. 62/511,237 filed May 25, 2017, which application is incorporated herein by reference in its entirety.

INTRODUCTION

The present disclosure relates to hematology systems and methods. More specifically, present disclosure relates detection of platelets in a biological sample, such as, a blood sample. The present disclosure also relates to detection of platelet clumps in a biological sample, such as, a blood sample.

Platelets, also called thrombocytes, are small colorless disk-shaped cell fragment without a nucleus, found in large numbers in blood and involved in clotting. Un-activated platelets are lens-shaped biconvex discoid structures, 2-3 μm in diameter and are the smallest cells in blood.

Low platelet concentration is thrombocytopenia and is due to either decreased production or increased destruction. Elevated platelet concentration is thrombocytosis and is either congenital, reactive (to cytokines), or due to unregulated production: one of the myeloproliferative neoplasms or certain other myeloid neoplasms. A disorder of platelet function is referred to as a thrombocytopathy.

Detection of platelets is often limited by noise in the analyzer. Noise can be caused by the light source (such as, fluctuation in laser power), the amplifying electronics or other sources. The methods disclosed herein separate platelets from noise.

Platelet clumps can be present in blood samples and can often form in collected sample and can interfere with cell counts. The methods disclosed herein identify presence of platelet clumps in a sample.

SUMMARY

Aspects of the instant disclosure include a method for differentiating platelets events from noise in a flow cytometer. The method may include flowing a sample comprising platelets through a flow cell of the flow cytometer; optically interrogating the sample flowing through the flow cell; detecting optical signals from the interrogated sample; separating detected signals into signals corresponding to Red Blood Cells (RBCs) events and events smaller than RBC events; separating the signals corresponding to events smaller than RBC events into putative platelet events and putative noise; converting signals corresponding to putative platelet events and putative noise into logarithmic scale; fitting the converted signals using Gaussian mixture model to generate a fitted distribution for the putative platelet events and putative noise; and identifying the putative platelet events as platelet events when the location and width of the fitted distribution is within range for platelet events.

In other aspects, the method includes prior to the identifying, comparing the location and width of the fitted distribution for the putative platelet events to the location and width of the fitted distribution for the putative noise, wherein when the distributions are outside of accepted range, fitting a Gaussian mixture model with a higher constraint for noise.

In some aspects, fitting the converted signals using Gaussian mixture model may involve using an expectation maximization algorithm. For example, the log for putative platelet events and putative noise can be plotted as a histogram and modeled using Gaussian mixture modeling.

In some aspects, a computer-implemented data analysis system may perform Expectation-Maximization (EM) algorithm to create Gaussian mixture model (GMM) for the log data for putative PLT events and putative noise. In some aspects, EM algorithm may be performed iteratively to improve a solution for the GMM.

In some aspects, a computer-implemented data analysis system may perform Expectation-Maximization (EM) algorithm to create Gaussian mixture model (GMM) for the log data for putative PLT events and putative noise as well as putative WBC and RBC events. In such cases, the GMM may be used to fit events smaller than WBCs and RBCs.

In other aspects, the method includes wherein the detecting signals from the interrogated sample is performed at a frequency of 100 recordings/second, 1000 recordings/second, 10,000 recordings/second, or 100,000 recordings/second.

In other aspects, the method includes wherein the signals comprise one or more of intermediate angle scatter (IAS), polarized side scatter (PSS), or axial light loss (ALL).

In other aspects, the method includes wherein the signals comprise intermediate angle scatter (IAS) and polarized side scatter (PSS).

In some aspects, the sample is a whole blood sample. In some aspects, the sample is an unlysed whole blood sample which contains intact RBCs. In some aspects, the sample is a whole blood sample that is stained with a cell permeable fluorescent dye that binds to nucleic acids and contains RBCs. In other aspects, the sample is a whole blood sample that is stained with a cell permeable fluorescent dye that binds to nucleic acids and is lysed to remove intact RBCs. In other aspects, the sample has been incubated with a RBC lysis reagent and is not stained with a cell permeable fluorescent dye that binds to nucleic acids.

In other aspects, the method includes wherein optically interrogating the particles comprises exciting the cells using a laser.

In other aspects, a system for performing the method for differentiating platelets events from noise in a flow cytometer as disclosed herein is provided. In certain aspects, the system may be comprise a flow cytometer.

Aspects of the instant disclosure include a non-transitory computer readable medium storing instructions that, when executed by a computing device, cause the computing device to perform the steps for differentiating platelets events from noise in a flow cytometer, as provided herein.

Aspects of the instant disclosure include a method for identifying a sample as comprising platelet clumps. The method may include incubating a sample with a reagent comprising a fluorescent dye and a red blood cell lysis agent for a period of time sufficient to lyse red blood cells and to fluorescently stain nucleus-containing cells; flowing the sample through a flow cell of the flow cytometer; optically interrogating the sample flowing through the flow cell; detecting optical signals from the interrogated sample; identifying events associated with a fluorescent signal below a threshold, wherein identified events have a fluorescent signal below the fluorescent signal from white blood cells (WBCs); and determining size of the identified events, wherein presence of events having a size larger than platelets indicates that the sample comprises platelet clumps.

In other aspects, the method includes selecting the identified events that are of a larger size than that of platelets; fitting a line to the selected events; extending the line into signals associated with WBCs; and reclassifying WBCs near the line as platelet clumps. The reclassifying removes the platelet clumps event from the WBCs events to provide a correct WBCs count.

In other aspects, the method includes wherein the signals comprise one or more of intermediate angle scatter (IAS), polarized side scatter (PSS), axial light loss (ALL), or fluorescence (FL).

In other aspects, the method includes wherein the signals comprise FL and PSS.

In some aspects, the sample is a whole blood sample. In other aspects, the sample has been stained with a fluorescent dye that binds to nucleic acid. In other aspects, the sample has been incubated with a RBC lysis reagent.

In other aspects, the method includes wherein optically interrogating the particles comprises exciting the cells using a laser.

In other aspects, a system for performing the method for identifying a sample as comprising platelet clumps as disclosed herein is provided. In certain aspects, the system may be comprise a flow cytometer.

Aspects of the instant disclosure include a non-transitory computer readable medium storing instructions that, when executed by a computing device, cause the computing device to perform the steps for identifying a sample as comprising platelet clumps, as provided herein.

DEFINITIONS

Figure 1:
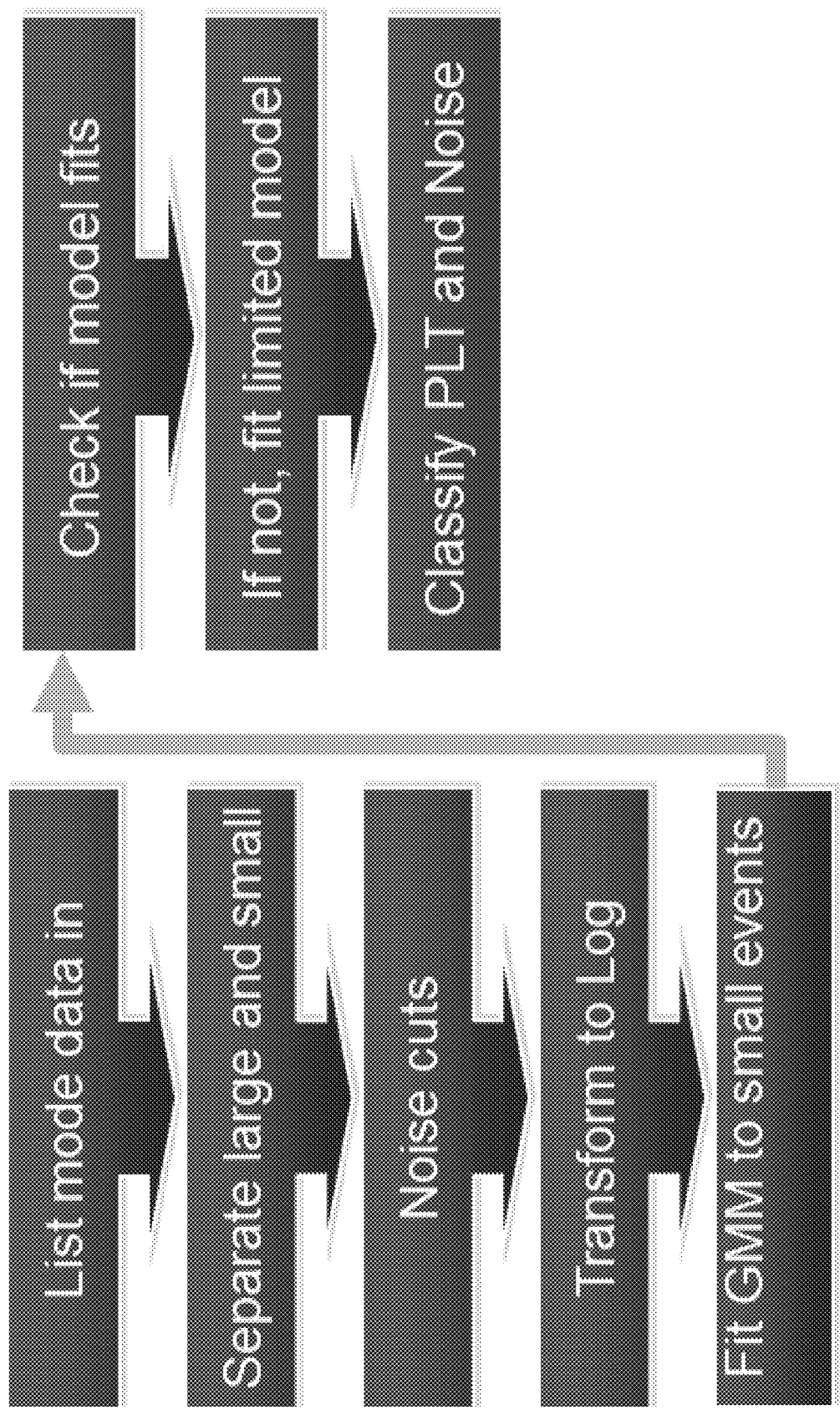
FIG. 1 depicts an exemplary method for differentiating platelets from noise signals detected from a hematology analyzer.

The term "assessing" includes any form of measurement, and includes determining if an element is present or not. The terms "determining", "measuring", "evaluating", "assessing" and "assaying" are used interchangeably and include quantitative and qualitative determinations. Assessing may be relative or absolute.

The term "bodily fluid" as used herein generally refers to fluids derived from a "biological sample" which encompasses a variety of sample types obtained from an individual or a population of individuals and can be used in a diagnostic, monitoring or screening assay. The definition encompasses blood and other liquid samples of biological origin. The definition also includes samples that have been manipulated in any way after their procurement, such as by mixing or pooling of individual samples, treatment with reagents, solubilization, or enrichment for certain components, such as nucleated cells, non-nucleated cells, pathogens, etc.

The term "biological sample" encompasses a clinical sample, and also includes cells in culture, cell supernatants, cell lysates, serum, plasma, biological fluid, and tissue samples. The term "biological sample" includes urine, saliva, cerebrospinal fluid, interstitial fluid, ocular fluid, synovial fluid, whole blood, blood fractions such as plasma and serum, and the like.

As used herein, the term "event" means a particle generating a signal that is sufficient to trigger at least one detector, such as, for example, the IAS detector, whereby that at least one detector signals the analyzer to collect measurements of that particle on all of the detectors enabled on the analyzer, e.g., ALL, IAS, PSS, and DSS. Particles include, but are not limited to, are white blood cells (WBC), red blood cells (RBC), red blood cell fragments, platelets (PLT), lipids, and platelet (PLT) clumps.

As used herein, the terms and phrases "diluent", "sheath", and "diluent/sheath", and the like, mean a sheath diluent of the type suitable for use with CELL-DYN® Sapphire™, CELL-DYN® Ruby™, CELL-DYN® 3000 series, and CELL-DYN® 4000 series hematology analyzers, which sheath diluents are commercially available from Abbott Laboratories, Santa Clara, Calif., and incorporated herein by reference.

As used herein, the term "DNA" means deoxyribonucleic acid, which is a polymeric chromosomal constituent of living cell nuclei. As used herein, the term "RNA" means ribonucleic acid.

DETAILED DESCRIPTION

The present disclosure includes methods of. Also provided are systems configured for performing the disclosed methods and computer readable medium storing instructions for performing steps of the disclosed methods.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Methods

Methods for Differentiating Platelets Events from Noise

The instant disclosure includes methods for differentiating platelets events from noise in a flow cytometer. The present methods are useful in uncovering platelet (PLT) populations that may be masked by noise and hence provide a more accurate PLT count than prior art methods.

Aspects of methods for differentiating PLT events from noise include flowing a sample comprising platelets through a flow cell of the flow cytometer, optically interrogating the sample flowing through the flow cell, detecting optical signals from the interrogated sample, separating detected signals into signals corresponding to Red Blood Cells (RBCs) events and events smaller than RBC events, separating the signals corresponding to events smaller than RBC events into putative platelet events and putative noise, converting signals corresponding to putative platelet events and putative noise into logarithmic scale, fitting the converted signals using Gaussian mixture model to generate a fitted distribution for the putative platelet events and putative noise; and identifying the putative platelet events as platelet events when the location and width of the fitted distribution is within range for platelet events.

The instant method involves using a lower threshold than prior art methods which lower threshold allows for inclusion of PLT data that may also include noise. The instant methods then parse out PLT data from noise in order to detect these PLT which had been masked by noise. In some aspects, the detected signals are signals above a size threshold of 1 centiliter. In contrast, prior art methods have a higher threshold which while decreasing noise also erroneously decreases PLT count.

The present methods for differentiating PLT events from noise may include a first threshold that separates signals corresponding to RBCs from signals corresponding to events smaller than RBCs, which smaller events include platelets, as well as, cell fragments, debris, and noise.

The signals corresponding to events smaller than RBCs are subjected to a further threshold—a second threshold which is lower than the first threshold. The second threshold is set such that some signals that may correspond to noise are also included. This lower threshold enables inclusion of weaker signals from smaller PLTs which may have been discarded if a higher threshold was used. In some embodiments, the second threshold may be set to screen out data that corresponds to events or noise having a size of less than 1 centiliter. In some instances, the first threshold may be set such that data corresponding to events having a greatest diameter of 6 µm or higher are separated from smaller events. The data for events having a greatest diameter less than 6 µm may be subjected to a second threshold that separates data for events having a greatest diameter less than 1 µm from events having a greatest diameter of 1 µm to less than 6 µm. This data corresponding to events having a greatest diameter of 1 µm—less than 6 µm may then be analyzed to identify PLTs in these events and to differentiate them from noise.

The step of identifying and differentiating PLTs from noise may involve converting signals corresponding to putative platelet events and putative noise into logarithmic scale.

The instant method may be performed on signals collected at a rate of at least 100 events/sec, such as, at least 1000-250,000 events/sec, 10,000-250,000 events/sec, 10,000-250,000 events/sec, 100,000-250,000 events/sec, e.g., 100,000 events/sec or 250,000 events/sec.

In certain aspects, the collected raw data may be converted into a logarithmic (log) scale. The conversion may involve a step of converting analog data into digital data. The conversion of analog data to digital data may be carried out prior to applying the first threshold, prior to applying the second threshold or after applying the second threshold. In some cases, the conversion of analog data to digital data to produce log data may be performed after the first threshold has been applied and events smaller than RBC events have been separated from RBC events and prior to applying the second threshold that separates out the signals that are obvious noise signals (e.g., signals corresponding to particles having a size of less than 1 centiliter).

The method may further include applying Gaussian mixture model to the converted data to separate putative PLT events from noise. In certain cases, the method may include fitting the converted signals using Gaussian mixture model to generate a fitted distribution for the putative platelet events and putative noise. In certain embodiments, when the location and width of the fitted distribution of the putative PLT events is within range for PLT events, the putative PLT events are identified as platelets.

In certain cases, the method may include prior to the identifying, comparing the location and width of the fitted distribution for the putative platelet events to the location and width of the fitted distribution for the putative noise, wherein when the distributions are outside of accepted range, the converted date may be fitted differently. For example, the converted data may be fitted using a Gaussian mixture model with a higher constraint for noise, followed by identifying PLT events and noise.

In certain cases, the signals detected by the flow cytometer and analyzed by the present methods may include one or more of intermediate angle scatter (IAS), polarized side scatter (PSS), or axial light loss (ALL). In other case, the signals detected by the flow cytometer and analyzed by the present methods may include intermediate angle scatter (IAS) and polarized side scatter (PSS).

In certain cases, the method may be performed in conjunction with methods that perform complete blood analysis by detecting and enumerating WBCs, RBCs, and platelets in a whole blood sample. The whole blood sample may be unlysed and unstained (e.g., not stained with a cell permeable fluorescent dye that binds to nucleic acids).

FIG. 1 illustrates an exemplary process involved in identifying PLTs in a blood sample. As a first step, raw data is collected and separated into data for large and small events. The large vents will eventually be classified as RBCs (or WBCs) and the small events represent both PLT and noise. A threshold is applied to cut out data that is obviously noise (e.g., data corresponding to particle size of less than 1 centiliter). The remainder of the data is transformed into log. In some instances, IAS3 channel is used to transform event peaks to log and is fitted using GMM (Gaussian mixture modelling) for small events (i.e., events smaller than WBCs and RBCs). Next, the location and widths of the fitted PLT and noise distributions is analyzed to determine whether these are in acceptable range. If the model fits, the small events are separated into PLTs and noise. If the model does not fit, a limited GMM for larger events (e.g., smaller than WBCs and RBCs and larger than 3 centiliter, 2 centiliter, or 1 centiliter) is applied and PLT and noise classified. As noted herein, this process may be performed in conjunction with determining complete blood cell count for a whole blood sample and thus may not involve lysis of RBCs. In certain case, the method may not involve staining the nuclei of cells in the blood sample with a fluorescent dye.

Methods of Detecting Platelet Clumps

On occasion, platelet clumps may form in a test sample before the sample is submitted to a platelet counting instrument (e.g., a hematology analyzer) for analysis. As a result, the platelet (PLT) count that is obtained may be artificially low. In addition, the PLT clumps may be counted as WBCs. Aspects of the instant disclosure include a method for identifying a sample as comprising platelet clumps. The method may further include providing a corrected WBC concentration after subtracting signals from PLT clumps. In certain aspects, when the number of PLT clumps is higher than a threshold for acceptable number of PLT clumps, the sample may be flagged and the cell count obtained for the sample disregarded. The system may further relay a failed test to a user.

In certain embodiments, a method of identifying a sample as comprising platelet clumps may include incubating a sample with a reagent comprising a cell permeable fluorescent dye and a red blood cell lysis agent for a period of time sufficient to lyse red blood cells and to fluorescently stain nucleus-containing cells; flowing the sample through a flow cell of the flow cytometer; optically interrogating the sample flowing through the flow cell; detecting optical signals from the interrogated sample; identifying events associated with a fluorescent signal below a threshold, wherein identified events have a fluorescent signal below the fluorescent signal from white blood cells (WBCs); and determining size of the identified events, wherein presence of events having a size larger than platelets indicates that the sample comprises platelet clumps.

In certain cases, the size threshold may be set such that particles having a greatest diameter greater 8 $\square$m and having a FL signal less than the threshold for WBCs may be identified as PLT clumps.

In certain aspects, the method may further involve, selecting the identified events that are of a larger size than that of platelets; fitting a line to the selected events; extending the line into signals associated with WBCs; and reclassifying WBCs near the line as platelet clumps. Reclassification of the WBCs into PLT clumps in turn corrects the WBCs count.

In certain aspects, the number of PLT clumps may be higher than a threshold. In such cases, the sample may be flagged as containing more PLT clumps than can be tolerated and the method may involve discarding the cell counts determined for this sample.

In certain aspects, the method of identifying PLT clumps may include using a 3 dimensional (3D) line to classify clumps. For example, instead of fitting a line to the selected events, a 3D line may be fitted to events having a FL signal below the threshold for FL signals for WBCs. 3D line fitting may be used when more than 5% of the PLT count is PLT clumps. In other words, when the number of PLT clumps identified using line fitting is higher than 5% of the number of PLTs in the blood sample, the events having a threshold lower than that for identifying WBCs are fitted using a 3D line and the method repeated by extending the 3D line into signals associated with WBCs; and reclassifying WBCs near the line as platelet clumps. Reclassification of the WBCs into PLT clumps in turn corrects the WBCs count.

In certain cases, the signals analyzed to identify PLT clumps may be one or more of fluorescence (FL), intermediate angle scatter (IAS), polarized side scatter (PSS), or axial light loss (ALL). In some aspects, the signals analyzed to identify PLT clumps may be fluorescence (FL) and polarized side scatter (PSS).

In some aspects, the sample may be stained with a fluorescent dye that is cell permeable and binds to nucleic acid. Using such a fluorescent dye ensures labeling of WBCs but not of normal RBCs and platelets. In some cases, the sample may also be lysed to remove RBCs.

Figure 2:
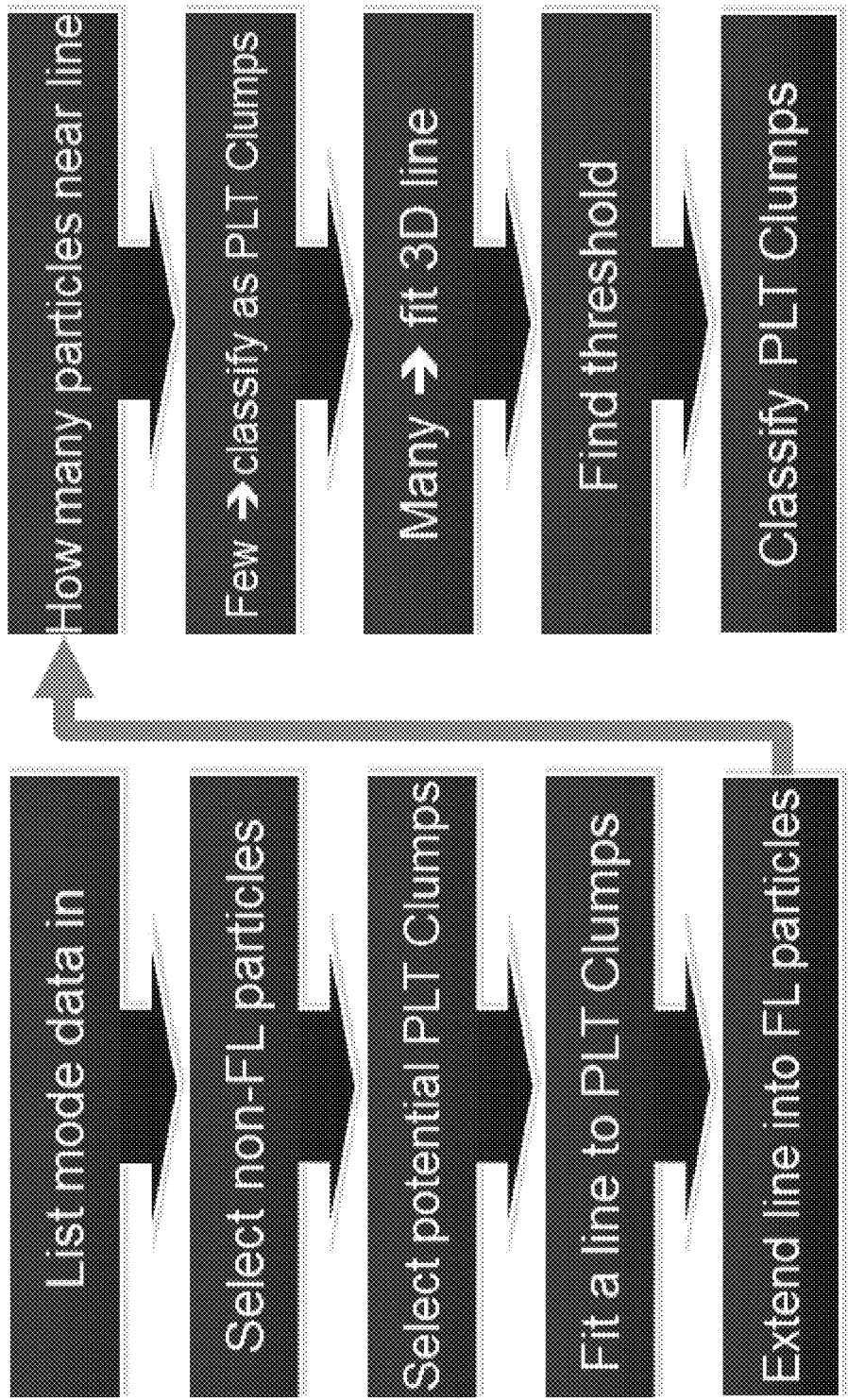
FIG. 2 depicts an exemplary method for detecting presence of platelet (PLT) clumps in a sample analyzed in a hematology analyzer.

FIG. 2 illustrates an exemplary process involved in identifying and classifying PLT clumps in a blood sample. As a first step, data is analyzed to select for particles having low fluorescence (i.e., below threshold set for nucleated blood cells, such as, WBCs). These particles are indicated as non-FL particles. PLT clumps have low fluorescence but have a size similar to WBCs. A line is fit to the PLT clumps and the line is extended into fluorescent (FL) particles to determine the number of particles near the line. If few particles are near the line, these are reclassified as PLT clumps (instead of WBCs). Presence of a large number of particles near the line indicated that a 3D line fit would be more accurate and a 3D line is fitted to the particles having low fluorescence as defined above. The fitted 3D line is extended into FL particles to determine the number of particles near the line and these are reclassified as PLT clumps (instead of WBCs).

As used herein, the term "trigger" means the minimum value of a signal that a measurement of the signal must exceed to be considered valid. Events providing a signal value above the trigger value are analyzed. Events providing a signal value below the trigger value are not included in data analysis. A scale of 0 to 5000 or a scale of 0 to 6000 is used for each channel of detection. Each value on the scale represents a gradation of the strength of a signal, with the value of 0 being the lowest strength and the value of 5000 (or 6000) being the highest strength. In the methods for differentiating PLTs from noise as described herein, the trigger may be set such that a lower signal triggers the detectors which while allowing more noise to be detected would ensure detection of signals from PLTs.

In some aspects, raw data that may be collected for blood analysis and in the methods disclosed herein may include events having at least five dimensions of information; namely ALL, IAS, PSS, DSS and FL1, along with time tags and other relevant information. In some aspects, only two or three of these types of raw data may be used in the methods disclosed herein. For example, in the methods for differentiating PLTs from noise, raw data corresponding to PSS and ALL may be used. In other aspects, such as in a method for identifying PLT clumps, FL and PSS and FL and ALL may be used.

Subjects from which a specimen may be acquired include but are not limited to human subjects, mammalian subjects (e.g., primates (apes, gorillas, simians, baboons, orangutans, etc.), ungulates (e.g., equines, bovines, camelids, swine, etc.), canines, felines, rodents (mice, rats, etc.), etc. Specimens may include biological fluid samples and biological samples (such as, a hematological sample, e.g., a blood sample) which may be processed prior to assessing, e.g., diluted, lysed, etc. e.g., those described in U.S. Pat. Nos. 9,011,773 and 9,028,778; the disclosures of which are incorporated herein by reference.

WBCs contain a relatively high concentration of DNA in their nuclei. When appropriately designed, a fluorescent dye can be used to differentiate between different sub-populations of WBCs and to differentiate WBCs from non-nucleated cells. For example, lymphocytes and basophils have different fluorescence signatures, despite having similar light scatter signatures. Further, mature RBCs do not contain DNA. Therefore, a fluorescent dye can be selected to differentiate between populations of blood cells. The purpose of the dye is to penetrate into live cells easily, bind DNA with high affinity, and emit strong fluorescence with adequate Stokes shift when the dye is excited by an appropriate source of light. The peak absorption of the dye in the visible band may substantially match the wavelength of the source of light (within 50 nm of the wavelength of the source of light, more preferably, within 25 nm of the wavelength of the source of light), in order to be properly excite the dye and achieve optimal results.

The fluorescent dye selected is such that it is: 1) capable of binding nucleic acids, 2) capable of penetrating cell membranes of WBCs and nucleated red blood cells (nRBCs), 3) excitable at a selected wavelength when subjected to a source of light, 4) emits fluorescence upon excitation by the source of light, and 5) is biostable and soluble in a liquid. The dye may be selected from group consisting of: acridine orange, SYBR 11, SYBR Green series dye, hexidium iodide, SYTO 11, SYTO 12, SYTO 13, SYTO 14, SYTO 16, SYTO 21, SYTO RNA Select, SYTO 24, SYTO 25 and any equivalents thereof. The dye is used to label WBCs and nRBCs, "screen out" unlysed RBCs and fragments of RBCs and platelets based on a fluorescence trigger configured in the hematology analyzer, and differentiate between sub-populations of WBCs. The dye is typically present at a concentration of from about 0.1 ng/mL to about 0.1 mg/mL. While various dyes are available, the dye selected is generally paired with the excitation source of the hematology analyzer such that a single exclusive dye is used to stain and excite fluorescence emission in nRBCs and all WBC sub-populations intended to be identified, quantified, and/or analyzed. As such, a single (i.e., exclusive) dye can be used to identify, quantify, and analyze WBC subpopulations, at once.

In one embodiment, a fluorescent dye is provided in a reagent, with combinations of 1) at least one surfactant, 2) at least one buffer, 3) at least one salt, and/or 4) at least antimicrobial agent, in sufficient quantities for carrying out staining and activating up to 1,000×103 cells per microliter. The at least one surfactant, such as "TRITON" X-100 or saponin, is used to destroy the membranes of RBC, and reduce the sizes of fragments of RBCs. The at least one surfactant is typically present at a concentration of from about 0.001% to about 5%. The at least one antimicrobial agent, such as those from "TRIADINE" or "PROCLIN" families, is used to prevent the contamination of the reagent from microbes. The concentration of the at least one antimicrobial agent is sufficient to preserve the reagent for the shelf life required. The at least one buffer, such as phosphate buffered saline (PBS) or 4-(2-hydroxyethyl)-1-piperazineethanesulfonic acid (HEPES), is used to adjust the pH of reaction mixture for controlling lysis of RBCs and preserving WBCs. The at least one buffer is typically present at a concentration of from about 0.01% to about 3%. The pH typically ranges from about 3 to about 12. The at least one salt, such as NaCl or Na2SO4, is used to adjust the osmolality to increase the effect of lysing and/or optimize WBC preservation. The at least one salt may be present at a concentration of from about 0.01% to about 3%. In certain cases, the at least one buffer can serve as the at least one salt, or the at least one salt can serve as the at least one buffer.

In general, lower osmolality, or hypotonicity, is used to accelerate the lysis of RBCs. The osmolality typically ranges from about 20 to about 250 mOsm. Lysis of RBCs can be made to occur at a temperature above room temperature (e.g., between about 30° C. to about 50° C., such as about 40° C.) over a relatively short period of time (e.g., less than about 25 seconds, less than about 17 seconds, or even less than about 9 seconds), following mixing of the sample of blood and the reagent at a ratio of about one part by volume sample to about 35 parts by volume reagent.

The scatter and fluorescence data for analysis is generally collected with a plurality of optical channels and at least one fluorescence channel, as described above.

In certain aspects, a fluorescence (FL) trigger may be used. FL trigger is described in detail in U.S. Pat. No. 9,091,625, which is herein incorporated by reference.

As such, aspects of the systems and methods presented herein use a fluorescence trigger for collecting and analyzing WBCs and WBC sub-populations. In one embodiment, prior to platelet (PLT) clumps detection, a fluorescence trigger is set between signals from RBCs and signals from WBCs (and nRBCs, when present). The optical and fluorescence information collected may then be used to distinguish (or differentiate) WBCs and WBC sub-populations from the PLT clumps. For example, two-dimensional cytograms can be used to identify and distinguish particles. As noted herein, in some aspects, the FL trigger may be set lower for data that is to be analyzed for overlap between platelets and noise. In other cases, in a method for analyzing overlap between platelets and noise, fluorescence signal is not used, and thus FL trigger may not be used.

As used herein, the expression "fluorescence information" means data collected from a fluorescence channel of a hematology analyzer. As used herein, the expression "fluorescence channel" means a detection device, such as a photomultiplier tube, set at an appropriate wavelength band for measuring the quantity of fluorescence emitted from a sample.

The method described herein may involve an automated method for simultaneous analysis of white blood cell differential, erythroblasts, red blood cells, and platelets and PLT clumps in liquid, such as, for example, blood. Other biological fluids, such as, for example, cerebrospinal fluid, ascites fluid, pleural fluid, peritoneal fluid, pericardial fluid, synovial fluid, dialysate fluid, and drainage fluid, can be used to determine various parameters of these fluids.

Systems

The instant disclosure includes systems for differentiating platelets events from noise in a flow cytometer. The systems of the instant disclosure involve components configured to perform the methods for differentiating platelets events from noise in a flow cytometer.

The instant disclosure also includes systems for identifying a sample as comprising platelet clumps, optionally correcting WBC count based on the detected number of PLT clumps and/or flagging the sample if the number of PLT clumps precludes an accurate cell analysis.

In certain embodiments, the system may include a flow cytometer that includes a flow cell, an optical particle interrogation system optically coupled to the flow cell and a non-transitory computer readable medium as further described herein. Such systems may include circuitry configured to perform one or more of the steps of the methods of as described herein.

The components of the instant systems may be assembled in a single device or may be assembled as a system of components separated between in two or more devices. In some instances, a device, a system or components thereof that performs the functions may be external but near (i.e., attached to the external housing of or on the same working surface or within the same room or building, etc.) a hematology analyzer that processes the sample. In other instances, a device, a system or components thereof that perform the functions may be positioned internally (i.e., within, inside of, or housed within) a hematology analyzer that processes the specimen and/or obtains the data.

By "data processing unit", as used herein, is meant any hardware and/or software combination that will perform the functions required of it. For example, any data processing unit herein may be a programmable digital microprocessor such as available in the form of an electronic controller, mainframe, server or personal computer (desktop or portable). Where the data processing unit is programmable, suitable programming can be communicated from a remote location to the data processing unit, or previously saved in a computer program product (such as a portable or fixed computer readable storage medium, whether magnetic, optical or solid state device based).

Substantially any circuitry can be configured to a functional arrangement within the devices and systems for performing the methods disclosed herein. The hardware architecture of such circuitry, including e.g., a specifically configured computer, is well known by a person skilled in the art, and can comprise hardware components including one or more processors (CPU), a random-access memory (RAM), a read-only memory (ROM), an internal or external data storage medium (e.g., hard disk drive). Such circuitry can also comprise one or more graphic boards for processing and outputting graphical information to display means. The above components can be suitably interconnected via a bus within the circuitry, e.g., inside a specific-use computer. The circuitry can further comprise suitable interfaces for communicating with general-purpose external components such as a monitor, keyboard, mouse, network, etc. In some embodiments, the circuitry can be capable of parallel processing or can be part of a network configured for parallel or distributive computing to increase the processing power for the present methods and programs. In some embodiments, the program code read out from the storage medium can be written into a memory provided in an expanded board inserted in the circuitry, or an expanded unit connected to the circuitry, and a CPU or the like provided in the expanded board or expanded unit can actually perform a part or all of the operations according to the instructions of the programming, so as to accomplish the functions described.

The systems of the instant disclosure may further include a "memory" that is capable of storing information such that it is accessible and retrievable at a later date by a computer. Any convenient data storage structure may be chosen, based on the means used to access the stored information. In certain aspects, the information may be stored in a "permanent memory" (i.e. memory that is not erased by termination of the electrical supply to a computer or processor) or "non-permanent memory". Computer hard-drive, CD-ROM, floppy disk, portable flash drive and DVD are all examples of permanent memory. Random Access Memory (RAM) is an example of non-permanent memory. A file in permanent memory may be editable and re-writable.

In addition to the components of the devices and systems of the instant disclosure, e.g., as described above, systems of the disclosure may include a number of additional components, such as data output devices, e.g., monitors and/or speakers, data input devices, e.g., interface ports, keyboards, etc., fluid handling components, slide handling components, power sources, etc.

The hematology analyzer for detecting signals from a sample flowing through a flow cell of the hematology analyzer may include illumination and detection optics of an apparatus suitable for hematology analysis (including flow cytometry).

In one embodiment, the blood sample analysis is conducted by means of Multiple Angle Polarized Scattering Separation technology (MAPSS), with an optional enhancement from fluorescence information. At least one photodiode, or at least one photomultiplier tube, or both at least one photodiode and at least one photomultiplier tube, are used to detect light scattered by each blood cell passing through a flow cell. Two or more photodiodes are used for measuring axial light loss (ALL) signals, which measure about 0° scatter (e.g. 0°-1°), and intermediate angle scatter (IAS) signals, which measure low angle (e.g., about 3° to about 15°) scatter. Two or more photomultiplier tubes are used for detecting 90° polarized side scatter (PSS) signals and 90° depolarized side scatter (DSS) signals. Additional photomultiplier tubes are used for fluorescence (FL1) measurements within appropriate wavelength range(s), depending on the choice of wavelength of the source of light. Each event captured on the system thus exhibits a plurality of dimensions of information, such as ALL, IAS (one or more channels, such as 2 or 3 channels), PSS, DSS, and fluorescence (one or more channels, such as 2 channels). The information from these detection channels is used for further analysis of blood cells. In certain aspects, the illumination and detection optics of an apparatus suitable for hematology analysis may include the components depicted in FIG. 1 of U.S. Pat. No. 9,091,625 which is herein incorporated by reference in its entirety. Referring to FIG. 1 of U.S. Pat. No. 9,091,625, an apparatus 10 comprises a source of light 12, a front mirror 14 and a rear mirror 16 for beam bending, a beam expander module 18 containing a first cylindrical lens 20 and a second cylindrical lens 22, a focusing lens 24, a fine beam adjuster 26, a flow cell 28, a forward scatter lens 30, a bulls-eye detector 32, a first photomultiplier tube 34, a second photomultiplier tube 36, and a third photomultiplier tube 38.

The source of light may be a laser. In alternative embodiments, a laser is selected that emits light at a wavelength between about 350 nm to about 700 nm; for example, in one embodiment a laser that emits light at about 488 nm is used. The source of light 12 can be a vertically polarized air-cooled Coherent Cube laser, commercially available from Coherent, Inc., Santa Clara, Calif. Lasers having wavelengths ranging from 350 nm to 700 nm can be used. Operating conditions for the laser are substantially similar to those of lasers currently used with "CELL-DYN" automated hematology analyzers. However, other sources of light can be used as well; such as, for example, lamps (e.g., mercury, xenon).

Additional details relating to the flow cell, the lenses, the focusing lens, the fine-beam adjust mechanism and the laser focusing lens can be found in U.S. Pat. No. 5,631,165, incorporated herein by reference, particularly at column 41, line 32 through column 43, line 11. The forward optical path system shown in FIG. 1 of U.S. Pat. No. 5,631,165 includes a spherical plano-convex lens 30 and a two-element photodiode detector 32 located in the back focal plane of the lens. In this configuration, each point within the two-element photodiode detector 32 maps to a specific collection angle of light from cells moving through the flow cell 28. The detector 32 can be a bulls-eye detector capable of detecting axial light loss (ALL) and intermediate angle forward scatter (IAS). U.S. Pat. No. 5,631,165 describes various alternatives to this detector at column 43, lines 12-52.

The first photomultiplier tube 34 (PMT1) measures depolarized side scatter (DSS). The second photomultiplier tube 36 (PMT2) measures polarized side scatter (PSS), and the third photomultiplier tube 38 (PMT3) measures fluorescence emission from about 360 nm to about 750 nm, depending upon the fluorescent dye selected and the source of light employed. In one embodiment, PMT3 measures fluorescence emission from about 440 nm to about 680 nm, or more specifically from about 500 nm to about 550 nm. The photomultiplier tube collects fluorescent signals in a broad range of wavelengths in order to increase the strength of the signal. Side-scatter and fluorescent emissions are directed to these photomultiplier tubes by dichroic beam splitters 40 and 42, which transmit and reflect efficiently at the required wavelengths to enable efficient detection. U.S. Pat. No. 5,631,165 describes various additional details relating to the photomultiplier tubes at column 43, line 53 though column 44, line 4.

Sensitivity is enhanced at photomultiplier tubes 34, 36, and 38, when measuring fluorescence, by using an immersion collection system. The immersion collection system is one that optically couples the first lens 30 to the flow cell 28 by means of a refractive index matching layer, enabling collection of light over a wide angle. U.S. Pat. No. 5,631,165 describes various additional details of this optical system at column 44, lines 5-31.

The photomultiplier tubes 34, 36, and 38 detect either side-scatter (light scattered in a cone whose axis is approximately perpendicular to the incident laser beam) or fluorescence (light emitted from the cells at a different wavelength from that of the incident laser beam).

While select portions of U.S. Pat. No. 5,631,165 are referenced above, U.S. Pat. No. 5,631,165 is incorporated herein by reference in its entirety.

Computer Readable Medium

The instant disclosure includes computer readable medium, including non-transitory computer readable medium, which stores instructions for differentiating platelets events from noise in a flow cytometer. Aspects of the instant disclosure include computer readable medium storing instructions that, when executed by a computing device, cause the computing device to perform one or more of the steps of for differentiating platelets events from noise in a flow cytometer.

In certain aspects, the non-transitory computer readable medium stores instructions that, when executed by a computing device, cause the computing device to detect optical signals from an interrogated sample, wherein the optical signals are generated from flowing the sample through a flow cell of a flow cytometer and optically interrogating the flowing sample; separate detected signals into signals corresponding to Red Blood Cells (RBCs) events and events smaller than RBC events; separate the signals corresponding to events smaller than RBC events into putative platelet events and putative noise; convert signals corresponding to putative platelet events and putative noise into logarithmic scale; fit the converted signals using Gaussian mixture model to generate a fitted distribution for the putative platelet events and putative noise; and identify the putative platelet events as platelet events when the location and width of the fitted distribution is within range for platelet events.

In some instances, the instructions comprise instructions that cause the computing device to prior to the identifying comparing the location and width of the fitted distribution for the putative platelet events to the location and width of the fitted distribution for the putative noise, wherein when the distributions are outside of accepted range, fitting a Gaussian mixture model with a higher constraint for noise.

In certain aspects, the instructions comprise instructions for converting collected raw data into a logarithmic (log) scale. The conversion may involve a step of converting analog data into digital data. The conversion of analog data to digital data may be carried out prior to applying the first threshold, prior to applying the second threshold or after applying the second threshold. In some cases, the conversion of analog data to digital data to produce log data may be performed after the first threshold has been applied and events smaller than RBC events have been separated from RBC events and prior to applying the second threshold that separates out the signals that are obvious noise signals (e.g., signals corresponding to particles having a size of less than 1 centiliter).

In certain aspects, the instructions include instructions for applying Gaussian mixture model to the converted data to separate putative PLT events from noise. In certain cases, the instructions include instructions to include fitting the converted signals using Gaussian mixture model to generate a fitted distribution for the putative platelet events and putative noise. In certain embodiments, when the location and width of the fitted distribution of the putative PLT events is within range for PLT events, the putative PLT events are identified as platelets.

In certain cases, the instructions include instructions for, prior to the identifying, comparing the location and width of the fitted distribution for the putative platelet events to the location and width of the fitted distribution for the putative noise, wherein when the distributions are outside of accepted range, the converted date may be fitted differently. For example, the converted data may be fitted using a Gaussian mixture model with a higher constraint for noise, followed by identifying PLT events and noise.

In certain cases, the signals detected by the flow cytometer and analyzed by the present methods may include one or more of intermediate angle scatter (IAS), polarized side scatter (PSS), or axial light loss (ALL). In other case, the signals detected by the flow cytometer and analyzed by the present methods may include intermediate angle scatter (IAS) and polarized side scatter (PSS).

In some instances, a computer readable medium of the instant disclosure stores instructions that cause a computing device to perform the steps for identifying a sample as comprising platelet clumps, optionally correcting WBC count based on the detected number of PLT clumps and/or flagging the sample if the number of PLT clumps precludes an accurate cell analysis.

In some aspects, the non-transitory computer readable medium stores instructions that, when executed by a computing device, cause the computing device to detect optical signals from an interrogated sample, wherein the optical signals are generated from flowing the sample through a flow cell of a flow cytometer and optically interrogating the flowing sample, wherein the sample has been incubated with a reagent, comprising a cell permeable fluorescent dye and a red blood cell lysis agent, for a period of time sufficient to lyse red blood cells and to fluorescently stain nucleus-containing cells; identify events associated with a fluorescent signal below a threshold, wherein identified events have a fluorescent signal below the fluorescent signal from white blood cells (WBCs); and determine size of the identified events, wherein presence of events having a size larger than platelets indicates that the sample comprises platelet clumps.

In certain embodiments, the instructions comprise instructions that cause the computing device to select the identified events that are of a larger size than that of platelets; fit a line to the selected events; extend the line into signals associated with WBCs; and reclassify WBCs near the line as platelet clumps.

In certain embodiments, instructions in accordance with the methods described herein can be coded onto a computer-readable medium in the form of "programming", where the term "computer readable medium" as used herein refers to any storage or transmission medium that participates in providing instructions and/or data to a computer for execution and/or processing. Examples of storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer.

The computer-implemented method described herein can be executed using programming that can be written in one or more of any number of computer programming languages. Such languages include, for example, Java (Sun Microsystems, Inc., Santa Clara, Calif.), Visual Basic (Microsoft Corp., Redmond, Wash.), and C++ (AT&T Corp., Bedminster, N.J.), as well as any many others.

The following examples are offered by way of illustration and not by way of limitation.

EXAMPLES

Example 1

Method for Differentiating Platelets from Noise Using a Hematology Analyzer

Platelets are the smallest cells in blood and their detection is often limited by noise in the analyzer. Noise can be caused by the light source (1% fluctuation in laser power), the amplifying electronics or other sources. Here light scatter information was collected for a small number of noise events and all the platelets that are above the noise. On this data an EM (Expectation-Maximization) algorithm was used to find the most likely distribution of the noise and the platelets. This algorithm improves the accuracy of the platelet enumeration because the algorithm can estimate how many platelets are masked by noise.

A hematology analyzer with a flow cell, forward and side scatter detectors and a software algorithm to estimate the number of platelets in a blood specimen in the presence of noise is used.

The hematology analyzer is set up with a low threshold in the trigger channel. The threshold is set so low, that a large noise spike is visible at the low end of the platelet distribution. The data is first log transformed and then analyzed by an EM algorithm that fits a gaussian distribution to the noise as well as the platelets. The output of the algorithm is the fraction of platelets of the total events captured in the data collection. The platelet event counts are then converted to the platelet concentration in blood by using the blood volume, dilution, flow rate and data collection time.

Figure 3:
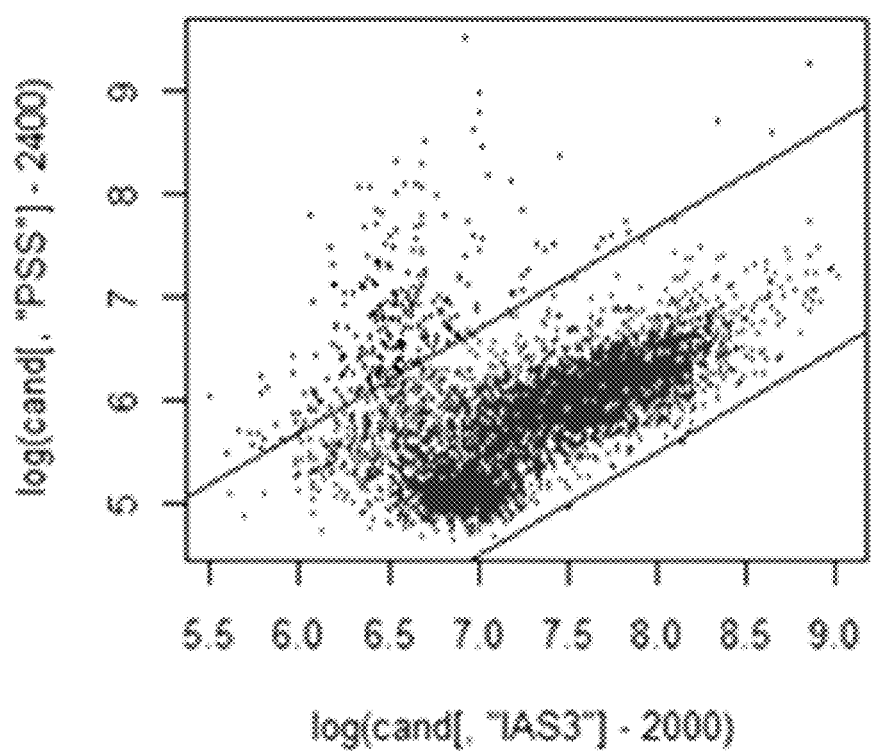
FIG. 3 provides a plot of logarithmic polarized side scatter (log PSS) and logarithmic intermediate angle scatter 3 (log IAS3) derived from PSS and IAS signals detected from a hematology analyzer for a first sample.

Data triggered on PSS, displayed log transformed in IAS3 and PSS is depicted in FIG. 3. As seen in FIG. 3, first obvious noise is eliminated by the two parallel lines. Only the events falling between the two parallel lines are considered further.

Figure 4:
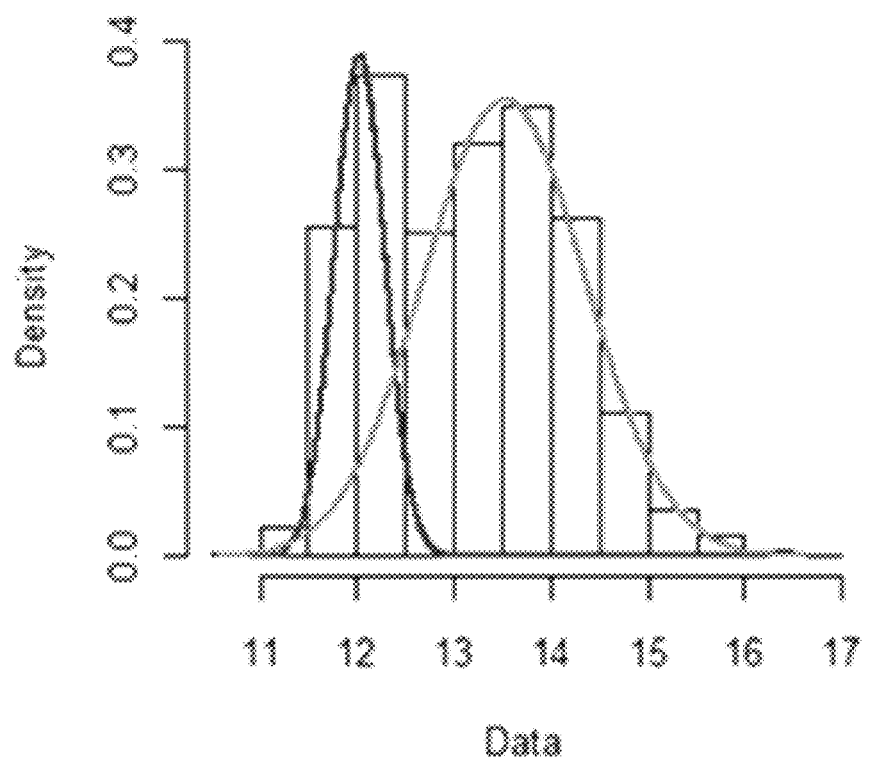
FIG. 4 provides a histogram for noise and platelet related data depicted in FIG. 3.

The events falling between the two parallel lines are plotted as a histogram and an EM algorithm is used to get the most likely noise (curve on the left side of the graph) and platelet (curve on the right side of the graph) distributions (see FIG. 4).

FIG. 4 shows the presence of platelets within the noise peak. The curve on the left side of the graph relates to noise and the curve on the right side of the graph corresponds to platelets. The EM algorithm finds the most likely noise and platelet distribution that fits the observed data. The final result for this case is that 25.5% of the filtered events are noise and 74.5% of the filtered events are platelets. With these numbers we easily can derive the total platelet event count and the blood concentration of platelets.

Figure 5:
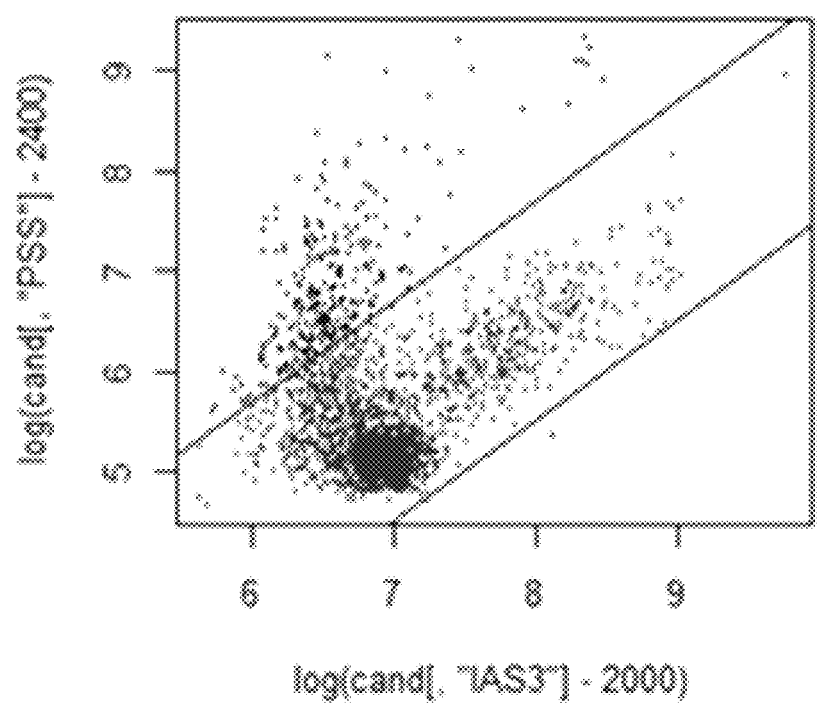
FIG. 5 provides a plot of logarithmic polarized side scatter (log PSS) and logarithmic intermediate angle scatter 3 (log IAS3) derived from PSS and IAS signals detected from a hematology analyzer for a second sample.
Figure 6:
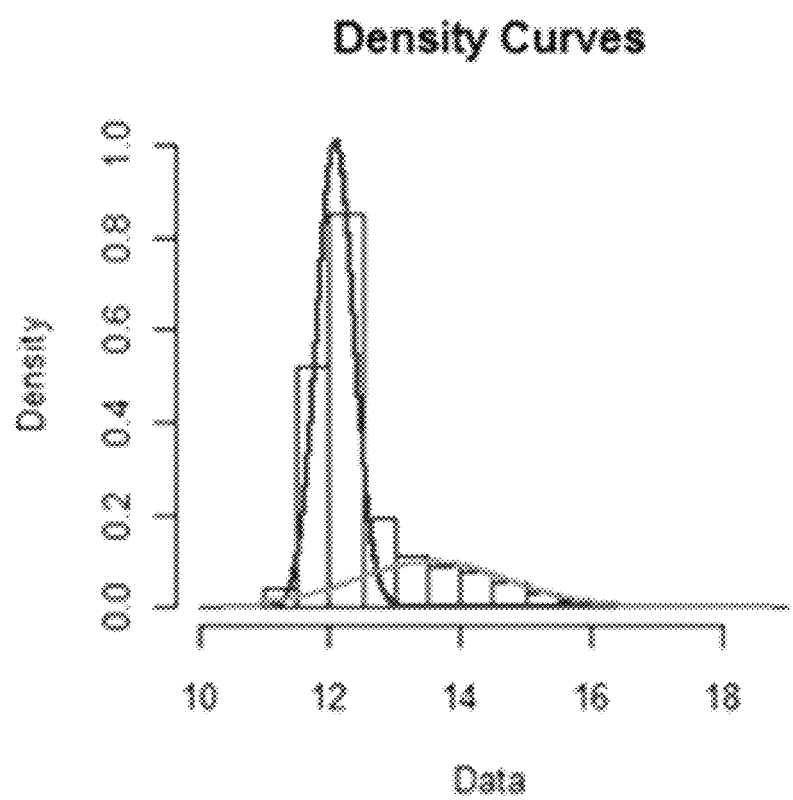
FIG. 6 provides a histogram for noise and platelet related data depicted in FIG. 5.

FIGS. 5 and 6 illustrate another example for differentiating platelets from noise in a sample having a lower platelet concentration than that in FIGS. 3 and 4. FIG. 5 depicts the use of two parallel lines to eliminate the most obvious noise. The events falling between the two parallel lines are plotted as a histogram and an EM algorithm is used to get the most likely noise (curve on the left side of the graph) and platelet (curve on the right side of the graph) distributions (see FIG. 6).

As seen in FIG. 6, the curve on the left side of the graph is the noise distribution and the curve on the right side of the graph is the platelet distribution. Almost half of the platelet counts are hidden below the noise peak. But the EM algorithm provides a good estimate of the platelet events in this measurement. The final result for this case is that 72% of the filtered events are noise and 28% of the filtered events are platelets.

The use of a lower threshold thus enables counting of platelets below the threshold after the noise is identified and filtered out.

Example 2

Method for Classifying PLT Clumps Using a Hematology Analyzer

Figure 7A:
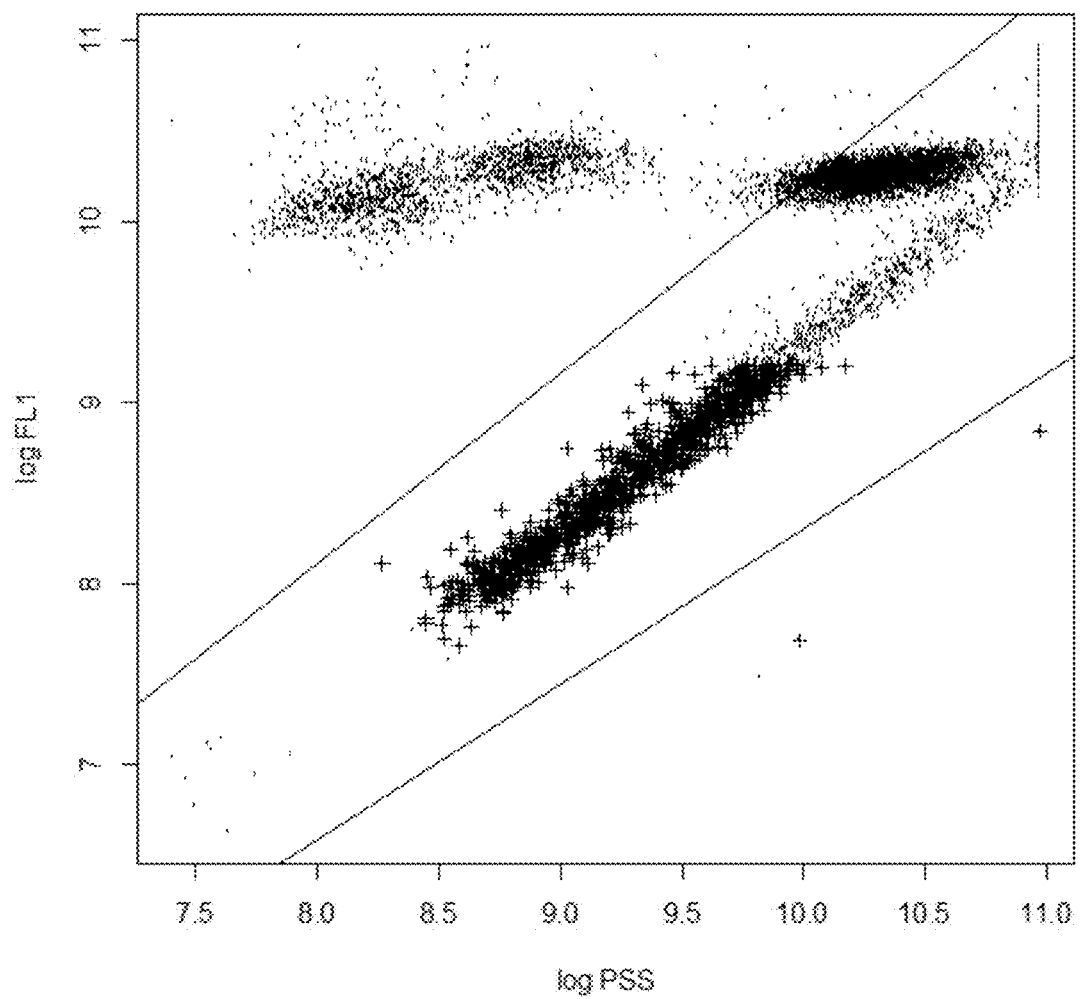
FIG. 7A depicts a plot for PSS (X-axis) and FL (Y-axis) recorded from a flow cytometer. Events having FL signals below that for WBCs are indicated by +.
Figure 7B:
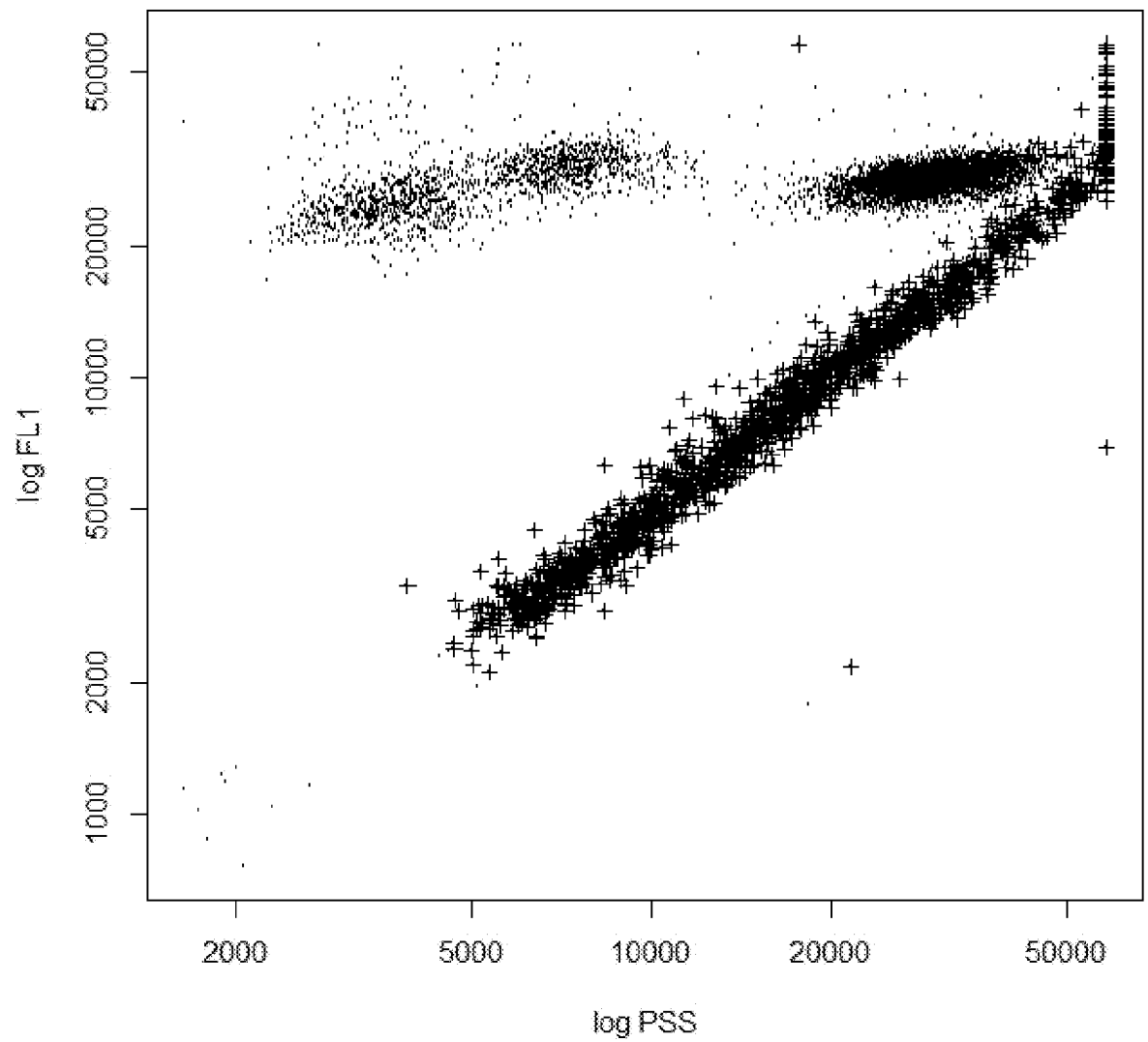
FIG. 7B depicts classification of additional PLT clumps by extending a line fitted to the identified PLT clumps into signals for WBCs.

FIG. 7A depicts a plot for PSS (X-axis) and FL (Y-axis) recorded from a flow cytometer. Events having FL signals below that for WBCs are selected as PLT clumps and are indicated by +. FIG. 7B depicts classification of additional PLT clumps by extending a line fitted to the identified PLT clumps in FIG. 7A into signals for WBCs. WBCs reclassified as PLT clumps are depicted by +.

Figure 8A:
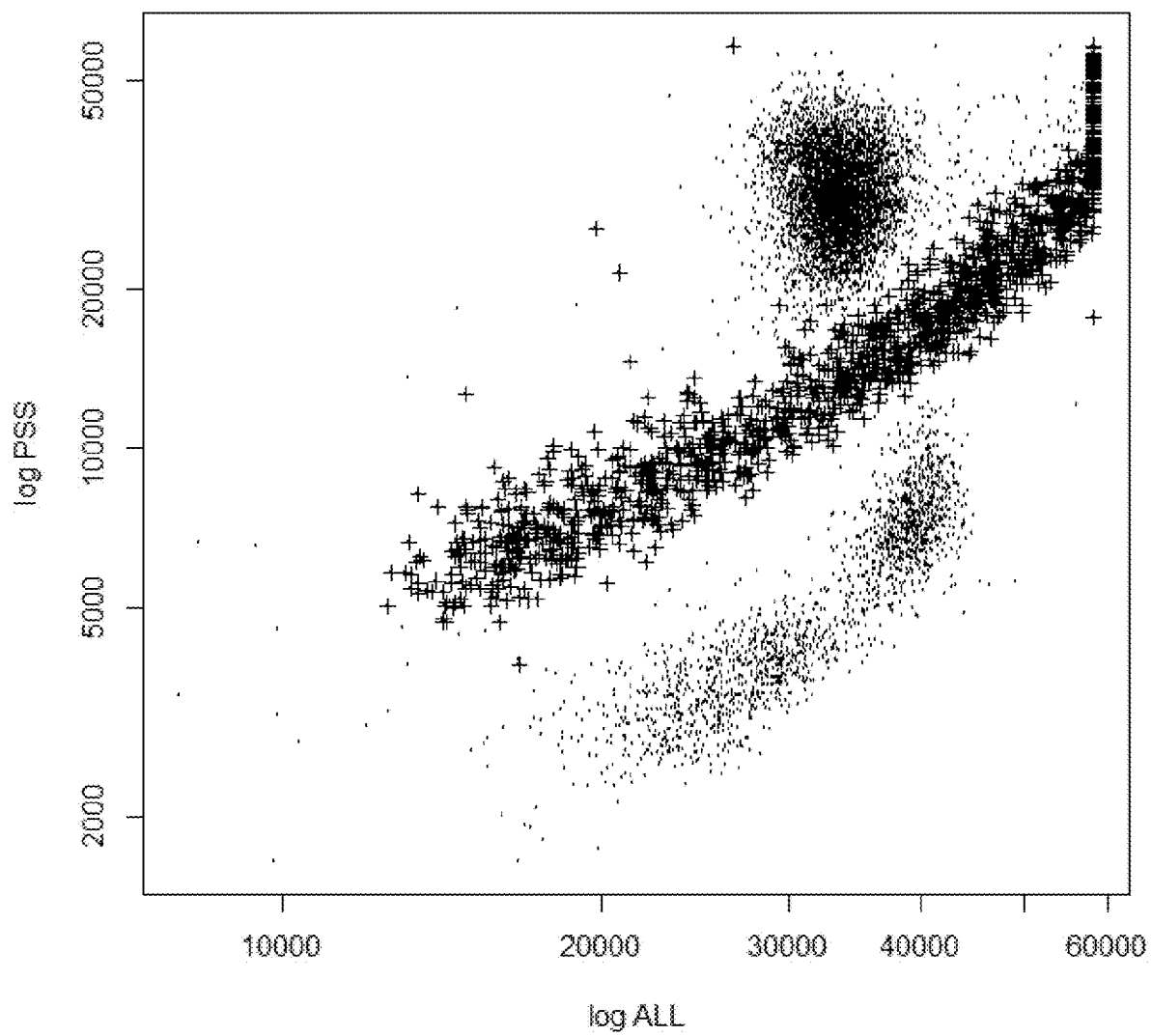
FIG. 8A depicts a plot for PSS (X-axis) and FL (Y-axis) recorded from a flow cytometer. Events having FL signals below that for WBCs are indicated by +.
Figure 8B:
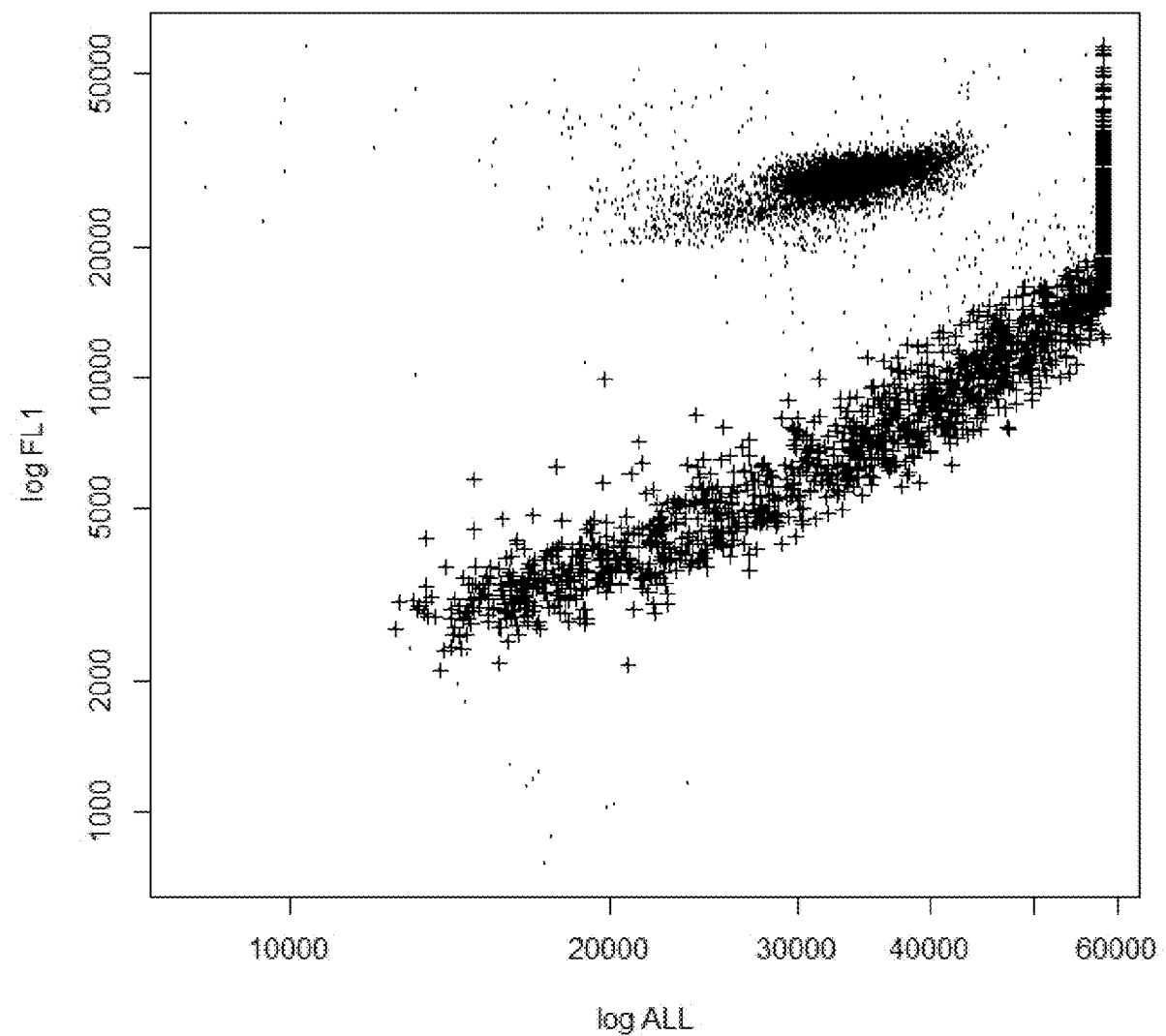
FIG. 8B depicts classification of additional PLT clumps by extending a 3D line fitted to the identified PLT clumps into signals for WBCs.

FIG. 8A depicts a plot for PSS (X-axis) and FL (Y-axis) recorded from a flow cytometer. Events having FL signals below that for WBCs are selected as PLT clumps and are indicated by +. FIG. 8B depicts classification of additional PLT clumps by extending a 3D line fitted to the identified PLT clumps into signals for WBCs. WBCs that are reclassified as PLT clumps are indicated by +.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A method for differentiating platelets events from noise in a flow cytometer, comprising:
    flowing a sample comprising platelets through a flow cell of the flow cytometer;
    optically interrogating the sample flowing through the flow cell;
    detecting optical signals from the interrogated sample;
    separating detected signals into signals corresponding to Red Blood Cells (RBCs) events and events smaller than RBC events;
    separating the signals corresponding to events smaller than RBC events into putative platelet events and putative noise;
    converting signals corresponding to putative platelet events and putative noise into logarithmic scale;
    fitting the converted signals using Gaussian mixture model to generate a fitted distribution for the putative platelet events and putative noise; and
    identifying the putative platelet events as platelet events when the location and width of the fitted distribution is within range for platelet events.

2. The method of claim 1, wherein the method comprises prior to the identifying, comparing the location and width of the fitted distribution for the putative platelet events to the location and width of the fitted distribution for the putative noise, wherein when the distributions are outside of accepted range, fitting a Gaussian mixture model with a higher constraint for noise.

3. The method of claim 1, wherein the signals comprise one or more of intermediate angle scatter (IAS), polarized side scatter (PSS), or axial light loss (ALL).

4. The method of claim 1, wherein the signals comprise intermediate angle scatter (IAS) and polarized side scatter (PSS).

5. The method of claim 1, wherein the sample is a whole blood sample.

6. The method of claim 5, wherein the whole blood sample is an unlysed whole blood sample.

7. The method of claim 1, wherein optically interrogating the particles comprises exciting the cells using a laser.

8. A non-transitory computer readable medium storing instructions that, when executed by a computing device, cause the computing device to:
    detect optical signals from an interrogated sample, wherein the optical signals are generated from flowing the sample through a flow cell of a flow cytometer and optically interrogating the flowing sample;
    separate detected signals into signals corresponding to Red Blood Cells (RBCs) events and events smaller than RBC events;
    separate the signals corresponding to events smaller than RBC events into putative platelet events and putative noise;
    convert signals corresponding to putative platelet events and putative noise into logarithmic scale;
    fit the converted signals using Gaussian mixture model to generate a fitted distribution for the putative platelet events and putative noise; and
    identify the putative platelet events as platelet events when the location and width of the fitted distribution is within range for platelet events.

9. The non-transitory computer readable medium of claim 8, wherein the instructions comprise instructions that cause the computing device to:
    prior to the identifying comparing the location and width of the fitted distribution for the putative platelet events to the location and width of the fitted distribution for the putative noise, wherein when the distributions are outside of accepted range, fitting a Gaussian mixture model with a higher constraint for noise.

10. The non-transitory computer readable medium of claim 8, wherein the signals comprise one or more of intermediate angle scatter (IAS), polarized side scatter (PSS), or axial light loss (ALL).

11. The non-transitory computer readable medium of claim 8, wherein the signals comprise intermediate angle scatter (IAS) and polarized side scatter (PSS).

12. The non-transitory computer readable medium of claim 8, wherein the sample is a whole blood sample.

13. The non-transitory computer readable medium of claim 12, wherein the sample is an unlysed blood sample.

14. A flow cytometer, comprising:
- a flow cell;
- an optical particle interrogation system optically coupled to the flow cell; and
- the non-transitory computer readable medium of claim 8.

* * * * *